(12) United States Patent
Fujita

(10) Patent No.: US 10,567,634 B2
(45) Date of Patent: Feb. 18, 2020

(54) IMAGE CAPTURING APPARATUS, COMMUNICATION APPARATUS, AND CONTROL METHODS THEREOF

(71) Applicant: CANON KABUSHIKI KAISHA, Tokyo (JP)

(72) Inventor: Shunji Fujita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/057,912

(22) Filed: Aug. 8, 2018

(65) Prior Publication Data
US 2019/0052795 A1    Feb. 14, 2019

(30) Foreign Application Priority Data
Aug. 10, 2017 (JP) ................. 2017-155880

(51) Int. Cl.
*H04W 76/30* (2018.01)
*H04N 5/232* (2006.01)
*H04M 1/725* (2006.01)

(52) U.S. Cl.
CPC ...... *H04N 5/23206* (2013.01); *H04M 1/7253* (2013.01); *H04N 5/23229* (2013.01); *H04N 5/232411* (2018.08); *H04W 76/30* (2018.02); *H04M 1/72533* (2013.01)

(58) Field of Classification Search
CPC .................................................. H04W 76/30
See application file for complete search history.

(56) References Cited

U.S. PATENT DOCUMENTS

2015/0310736 A1* 10/2015 Yamada ................. G08C 17/02
398/107
2016/0366290 A1* 12/2016 Hoshino ............ H04N 1/00225

FOREIGN PATENT DOCUMENTS

JP    2014-027338 A    2/2014

* cited by examiner

*Primary Examiner* — Michael T Vu
(74) *Attorney, Agent, or Firm* — Cowan, Liebowitz & Latman, P.C.

(57) ABSTRACT

An image capturing apparatus comprises a first wireless communication unit that performs communication with a communication apparatus using a first wireless communication method, a second wireless communication unit that performs wireless communication with the communication apparatus using a second wireless communication method with which energy consumption is lower than with the first wireless communication method, and a control unit that, if a processing request relating to image data is received from the communication apparatus via the first wireless communication unit, disconnect a connection with the communication apparatus via the first wireless communication unit, and transmit a completion notification after executing predetermined processing corresponding to the processing request to the communication apparatus via the second wireless communication unit.

19 Claims, 16 Drawing Sheets

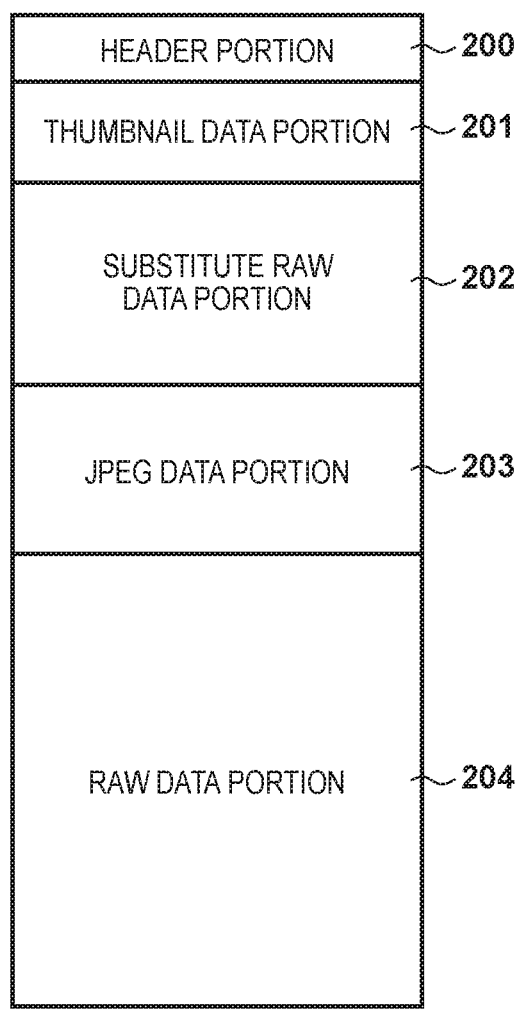
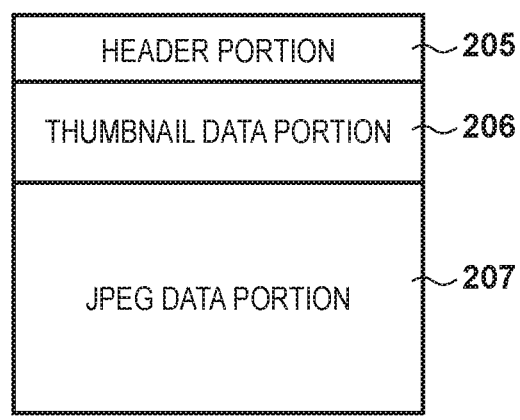
FIG. 2A
FIG. 2B

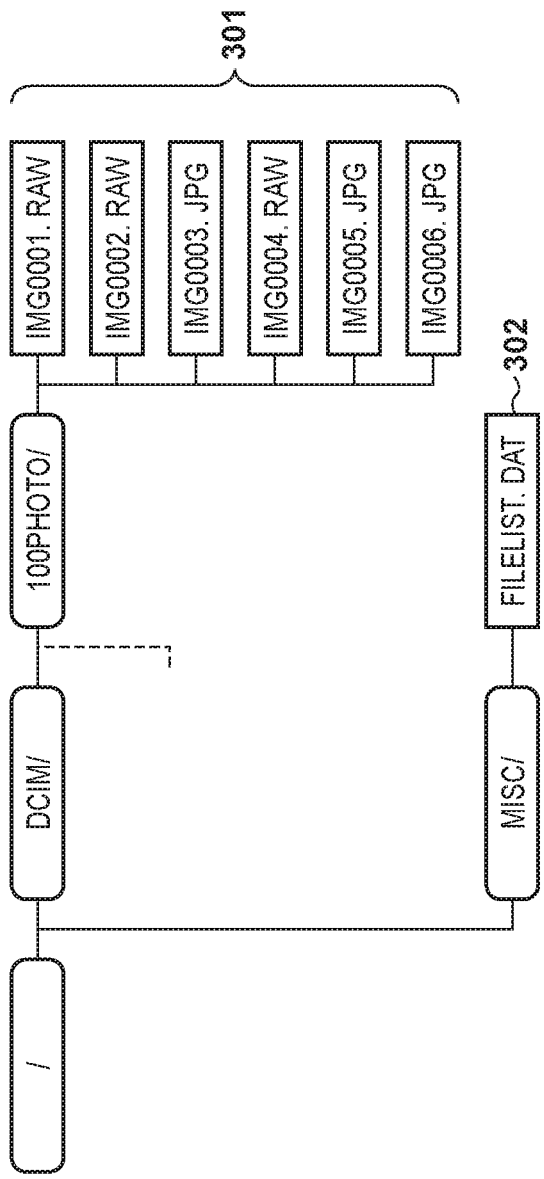

| FILE PATH | IMAGE ID | GENERATION METHOD | DEVELOPMENT TARGET IMAGE ID |
|---|---|---|---|
| /DCIM/100PHOTO/IMG0001.RAW | DCIM_100PHOTO_IMG0001 | SHOOTING | N/A |
| /DCIM/100PHOTO/IMG0002.RAW | DCIM_100PHOTO_IMG0002 | SHOOTING | N/A |
| /DCIM/100PHOTO/IMG0003.JPG | DCIM_100PHOTO_IMG0003 | SHOOTING | N/A |
| /DCIM/100PHOTO/IMG0004.RAW | DCIM_100PHOTO_IMG0004 | SHOOTING | N/A |
| /DCIM/100PHOTO/IMG0005.JPG | DCIM_100PHOTO_IMG0005 | RAW DEVELOPMENT | DCIM_100PHOTO_IMG0001 |
| /DCIM/100PHOTO/IMG0006.JPG | DCIM_100PHOTO_IMG0006 | RAW DEVELOPMENT | DCIM_100PHOTO_IMG0002 |

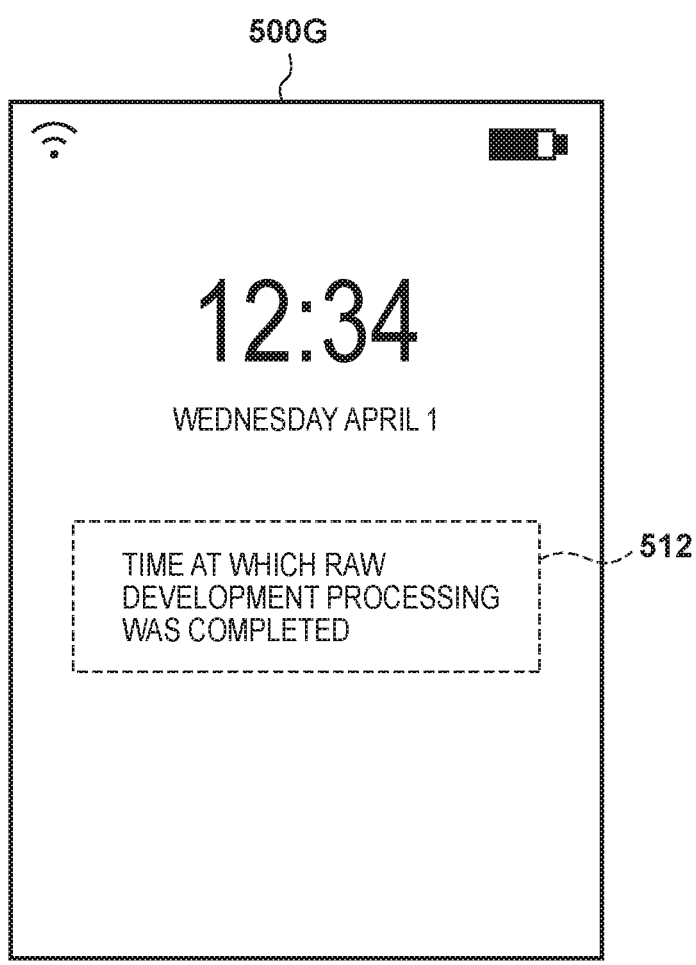

FIG. 6A

| | | |
|---|---|---|
| | MESSAGE TYPE | DEVELOPMENT PROCESSING REQUEST — 601 |
| | SESSION NUMBER | 0001 — 602 |
| | IMAGE NUMBER | 1 — 603 |
| | COMPLETION NOTIFICATION COMMUNICATION METHOD | WIRELESS LAN — 604 |
| IMAGE #1 | RAW TYPE | SUBSTITUTE RAW — 605 |
| | IMAGE ID | DCIM_100PHOTO_IMG0001 — 606 |
| | DEVELOPMENT PARAMETER | WHITE BALANCE: SUNLIGHT — 607 |

FIG. 6B

| | |
|---|---|
| MESSAGE TYPE | DEVELOPMENT PROCESSING ACCEPTANCE |
| SESSION NUMBER | 0001 |
| COMPLETION NOTIFICATION COMMUNICATION METHOD | WIRELESS LAN |

FIG. 6C

| | | |
|---|---|---|
| | MESSAGE TYPE | DEVELOPMENT PROCESSING COMPLETION |
| | SESSION NUMBER | 0001 |
| | IMAGE NUMBER | 1 |
| IMAGE #1 | JPEG ACQUISITION URL | /proxyjpg?param=dcim_100photo_img0001_0001 — 608 |
| | RAW DEVELOPMENT ESTIMATION TIME | 6000 — 609 |

FIG. 6D

| MESSAGE TYPE | | DEVELOPMENT PROCESSING REQUEST |
|---|---|---|
| SESSION NUMBER | | 0052 |
| IMAGE NUMBER | | 3 |
| COMPLETION NOTIFICATION COMMUNICATION METHOD | | BLE |
| IMAGE #1 | RAW TYPE | RAW |
| | IMAGE ID | DCIM_100PHOTO_IMG0001 |
| | DEVELOPMENT PARAMETER | WHITE BALANCE: SUNLIGHT |
| IMAGE #2 | RAW TYPE | RAW |
| | IMAGE ID | DCIM_100PHOTO_IMG0002 |
| | DEVELOPMENT PARAMETER | WHITE BALANCE: LAMP COLOR |
| IMAGE #3 | RAW TYPE | RAW |
| | IMAGE ID | DCIM_100PHOTO_IMG0003 |
| | DEVELOPMENT PARAMETER | WHITE BALANCE: CLOUDY |

| MESSAGE TYPE | DEVELOPMENT PROCESSING ACCEPTANCE |
|---|---|
| SESSION NUMBER | 0052 |
| COMPLETION NOTIFICATION COMMUNICATION METHOD | BLE |

FIG. 6F

| MESSAGE TYPE | | DEVELOPMENT PROCESSING COMPLETION |
|---|---|---|
| SESSION NUMBER | | 0052 |
| IMAGE NUMBER | | 3 |
| IMAGE #1 | JPEG ACQUISITION URL | /DCIM/100PHOTO/IMG0012.JPG |
| IMAGE #2 | JPEG ACQUISITION URL | /DCIM/100PHOTO/IMG0013.JPG |
| IMAGE #3 | JPEG ACQUISITION URL | /DCIM/100PHOTO/IMG0014.JPG |

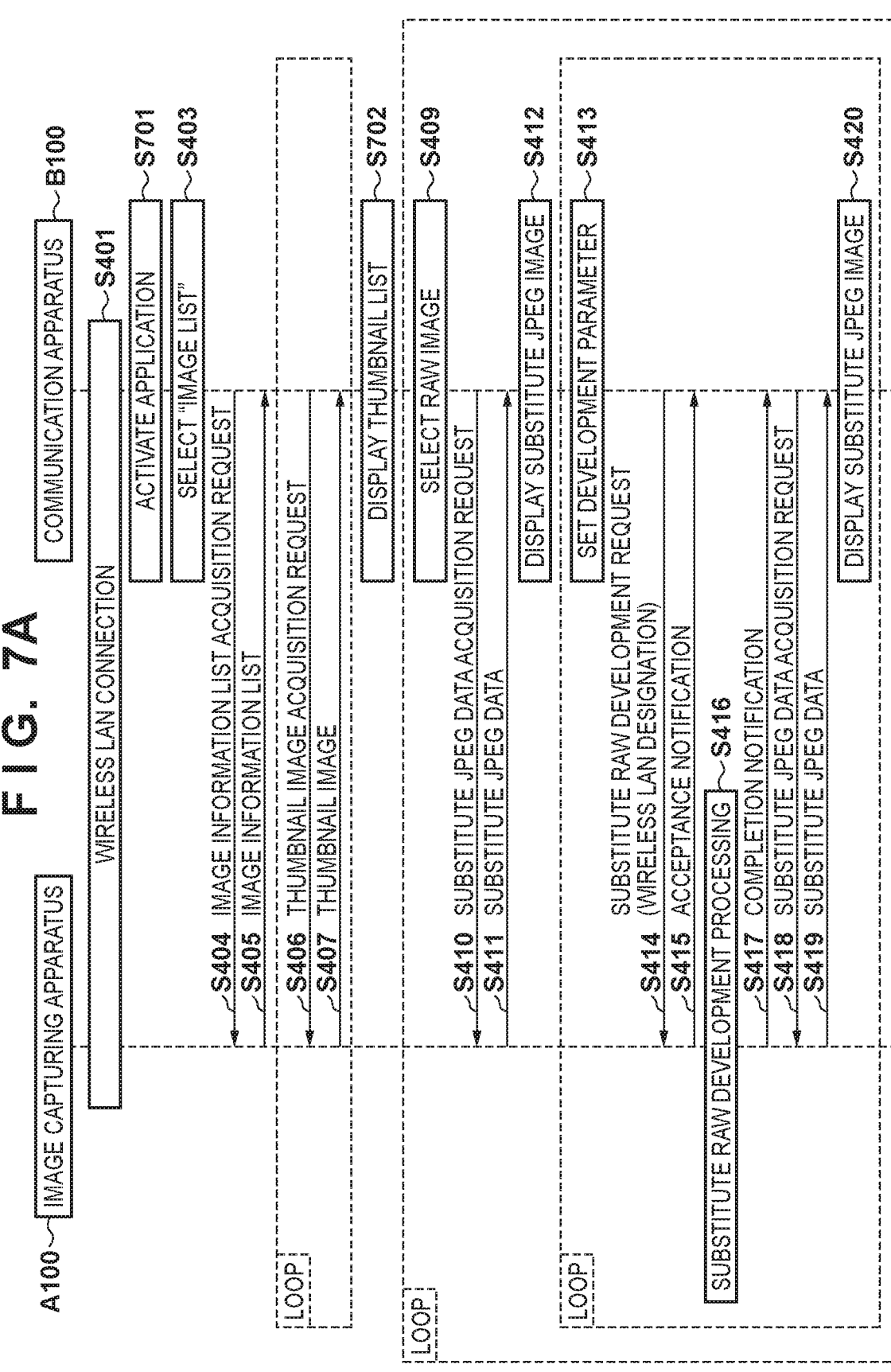

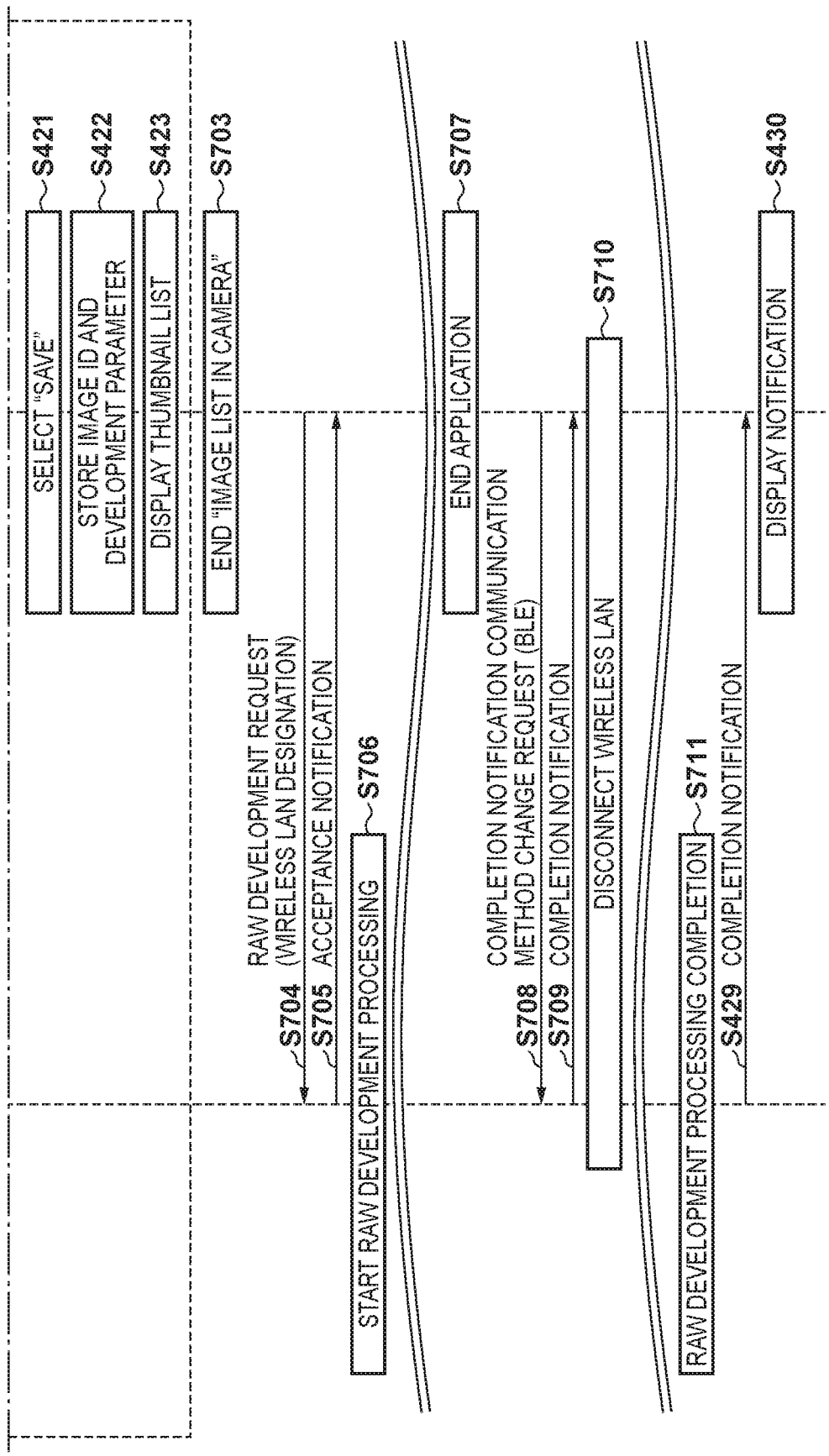

FIG. 9A

| | 901 |
|---|---|
| MESSAGE TYPE | DEVELOPMENT PROCESSING REQUEST |
| SESSION NUMBER | 0052 |
| IMAGE NUMBER | 3 |
| COMPLETION NOTIFICATION COMMUNICATION METHOD | WIRELESS LAN |
| IMAGE #1 RAW TYPE | RAW |
| IMAGE #1 IMAGE ID | DCIM_100PHOTO_IMG0001 |
| IMAGE #1 DEVELOPMENT PARAMETER | WHITE BALANCE: SUNLIGHT |
| IMAGE #2 RAW TYPE | RAW |
| IMAGE #2 IMAGE ID | DCIM_100PHOTO_IMG0002 |
| IMAGE #2 DEVELOPMENT PARAMETER | WHITE BALANCE: LAMP COLOR |
| IMAGE #3 RAW TYPE | RAW |
| IMAGE #3 IMAGE ID | DCIM_100PHOTO_IMG0003 |
| IMAGE #3 DEVELOPMENT PARAMETER | WHITE BALANCE: CLOUDY |

FIG. 9B

| MESSAGE TYPE | DEVELOPMENT PROCESSING ACCEPTANCE |
|---|---|
| SESSION NUMBER | 0052 |
| COMPLETION NOTIFICATION COMMUNICATION METHOD | WIRELESS LAN |

FIG. 9C

| MESSAGE TYPE | COMPLETION NOTIFICATION COMMUNICATION METHOD CHANGE REQUEST | 902 |
|---|---|---|
| SESSION NUMBER | 0052 | |
| COMPLETION NOTIFICATION COMMUNICATION METHOD | BLE | 903 |

FIG. 9D

| MESSAGE TYPE | COMPLETION NOTIFICATION COMMUNICATION METHOD CHANGE COMPLETION | 904 |
|---|---|---|
| SESSION NUMBER | 0052 | |
| COMPLETION NOTIFICATION COMMUNICATION METHOD | BLE | |

US 10,567,634 B2

IMAGE CAPTURING APPARATUS, COMMUNICATION APPARATUS, AND CONTROL METHODS THEREOF

BACKGROUND OF THE INVENTION

Field of the Invention

The present invention relates to an image capturing apparatus, a communication apparatus and control method thereof, particularly relates to a technique in which a communication apparatus controls an image capturing apparatus through wireless communication.

Description of the Related Art

In recent years, image capturing apparatuses such as digital cameras capable of recording shot images not only in JPEG format but also RAW format without degradation of the output from the image sensor have been practically realized. There are also image capturing apparatuses having a function of performing, after shooting, development processing on data recorded in the RAW format during shooting to convert the data into the JPEG format. On the other hand, in recent years, there are also image capturing apparatuses capable of communicating with a communication apparatus such as a smartphone or a tablet using a communication means such as a wireless LAN, and performing remote control with the communication apparatus (Japanese Patent Laid-Open No. 2014-027338).

According to the above-described conventional techniques, an application of the communication apparatus is also capable of controlling the RAW development function of the image capturing apparatus via the wireless LAN. However, the RAW development processing is processing that applies a load, and as the pixel nwriber of the image data increases, the amount of time required increases. Thus, if the image data has a large pixel number, there is a possibility that a waiting time from when the communication apparatus transmits a development processing request to the image capturing apparatus to when a completion notification is received will increase. Also, during the waiting time, the communication apparatus is connected to the wireless LAN but does not transfer data at all, and thus energy consumption is wasted.

SUMMARY OF THE INVENTION

The present invention has been made in consideration of the aforementioned problems, and realizes a technique with which, when controlling an image capturing apparatus through wireless communication, it is possible to reduce the energy consumption required for wireless communication without reducing conventional functionality.

In order to solve the aforementioned problems, the present invention provides an image capturing apparatus comprising: a first wireless communication unit configured to perform communication with a communication apparatus using a first wireless communication method; a second wireless communication unit configured to perform wireless communication with the communication apparatus using a second wireless communication method with which energy consumption is lower than with the first wireless communication method; and a control unit configured to, if a processing request relating to image data is received from the communication apparatus via the first wireless communication unit, disconnect a connection with the communication apparatus via the first wireless communication unit, and transmit a completion notification after executing predetermined processing corresponding to the processing request to the communication apparatus via the second wireless communication unit.

In order to solve the aforementioned problems, the present invention provides a communication apparatus comprising: a first wireless communication unit configured to perform communication with an image capturing apparatus using a first wireless communication method; a second wireless communication unit configured to perform wireless communication with the image capturing apparatus using a second wireless communication method with which energy consumption is lower than with the first wireless communication method; and a control unit configured to, if a processing request relating to image data is transmitted to the image capturing apparatus via the first wireless communication unit, disconnect a connection with the image capturing apparatus via the first wireless communication unit, and receive a completion notification after executing predetermined processing corresponding to the processing request from the image capturing apparatus via the second wireless communication unit.

In order to solve the aforementioned problems, the present invention provides a control method of an image capturing apparatus having a first wireless communication unit configured to perform communication with a communication apparatus using a first wireless communication method, and a second wireless communication unit configured to perform wireless communication with the communication apparatus using a second wireless communication method with which energy consumption is lower than with the first wireless communication method, the method comprising: if a processing request relating to image data is received from the communication apparatus via the first wireless communication unit, disconnecting a connection with the communication apparatus via the first wireless communication unit; and transmitting a completion notification after executing predetermined processing corresponding to the processing request to the communication apparatus via the second wireless communication unit.

In order to solve the aforementioned problems, the present invention provides a control method of a communication apparatus having a first wireless communication unit configured to perform communication with an image capturing apparatus using a first wireless communication method and a second wireless communication unit configured to perform wireless communication with the image capturing apparatus using a second wireless communication method with which energy consumption is lower than with the first wireless communication method, the method comprising: if a processing request relating to image data is transmitted to the image capturing apparatus via the first wireless communication unit, disconnecting a connection with the communication apparatus via the first wireless communication unit; and receiving a completion notification after executing predetermined processing corresponding to the processing request from the image capturing apparatus via the second wireless communication unit.

In order to solve the aforementioned problems, the present invention provides a computer-readable storage medium storing a program for causing a computer to function as an image capturing apparatus comprising: a first wireless communication unit configured to perform communication with a communication apparatus using a first wireless communication method; a second wireless communication unit configured to perform wireless communication with the communication apparatus using a second wireless communication method with which energy consumption is lower than with the first wireless communication method; and a control unit configured to, if a processing request relating to image data is received from the communication apparatus via the first wireless communication unit, disconnect a connection with the communication apparatus via the first wireless communication unit, and transmit a completion notification after executing predetermined processing corresponding to the processing request to the communication apparatus via the second wireless communication unit.

In order to solve the aforementioned problems, the present invention provides a computer-readable storage medium storing a program for causing a computer to function as a communication apparatus comprising: a first wireless communication unit configured to perform communication with an image capturing apparatus using a first wireless communication method; a second wireless communication unit configured to perform wireless communication with the image capturing apparatus using a second wireless communication method with which energy consumption is lower than with the first wireless communication method; and a control unit configured to, if a processing request relating to image data is transmitted to the image capturing apparatus via the first wireless communication unit, disconnect a connection with the image capturing apparatus via the first wireless communication unit, and receive a completion notification after executing predetermined processing corresponding to the processing request from the image capturing apparatus via the second wireless communication unit.

According to the present invention, when controlling an image capturing apparatus through wireless communication, it is possible to reduce the energy consumption required for wireless communication without reducing conventional functionality.

Further features of the present invention will become apparent from the following description of exemplary embodiments with reference to the attached drawings.

BRIEF DESCRIPTION OF THE DRAWINGS

FIGS. 2A and 2B are diagrams showing data configurations of a RAW file and a JPEG file of the embodiment.

FIGS. 3A and 3B are diagrams showing file structures of a RAW file and a JPEG file of the embodiment.

FIGS. 5A to 5G are exemplary diagrams of application screens of the communication apparatus of the first embodiment.

FIGS. 6A to 6F are exemplary diagrams of messages that are transmitted and received through wireless communication of the first embodiment.

FIGS. 7A and 7B are sequence diagrams showing a communication apparatus of a second embodiment controlling an image capturing apparatus through wireless communication.

FIGS. 9A to 9D are exemplary diagrams of messages that are transmitted and received through wireless communication of the second embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

First Embodiment

A first embodiment will be described below.

This embodiment describes a system in which wireless communication is performed by a digital camera and a smartphone that respectively serve as an image capturing apparatus and a communication apparatus that include a wireless LAN (Local Area Network) function and a short-range wireless communication function such as Bluetooth®. Note that the image capturing apparatus of the present embodiment is not limited to being a digital single lens reflex camera, digital compact camera, digital video camera, etc., and may be a surveillance camera, a medical device, or the like. Also, the communication apparatus of the present embodiment is not limited to being a smartphone, which is a type of mobile phone, and may be a mobile device such as a watch-type terminal, an eyeglasses-type: terminal, or a digital camera, tablet device, or personal computer (PC) that has a wireless communication function.

Configuration of Image Capturing Apparatus

First, the configurations and functions of the image capturing apparatus and the communication apparatus of the present embodiment will be generally described with reference to FIG. 1.

Figure 1:
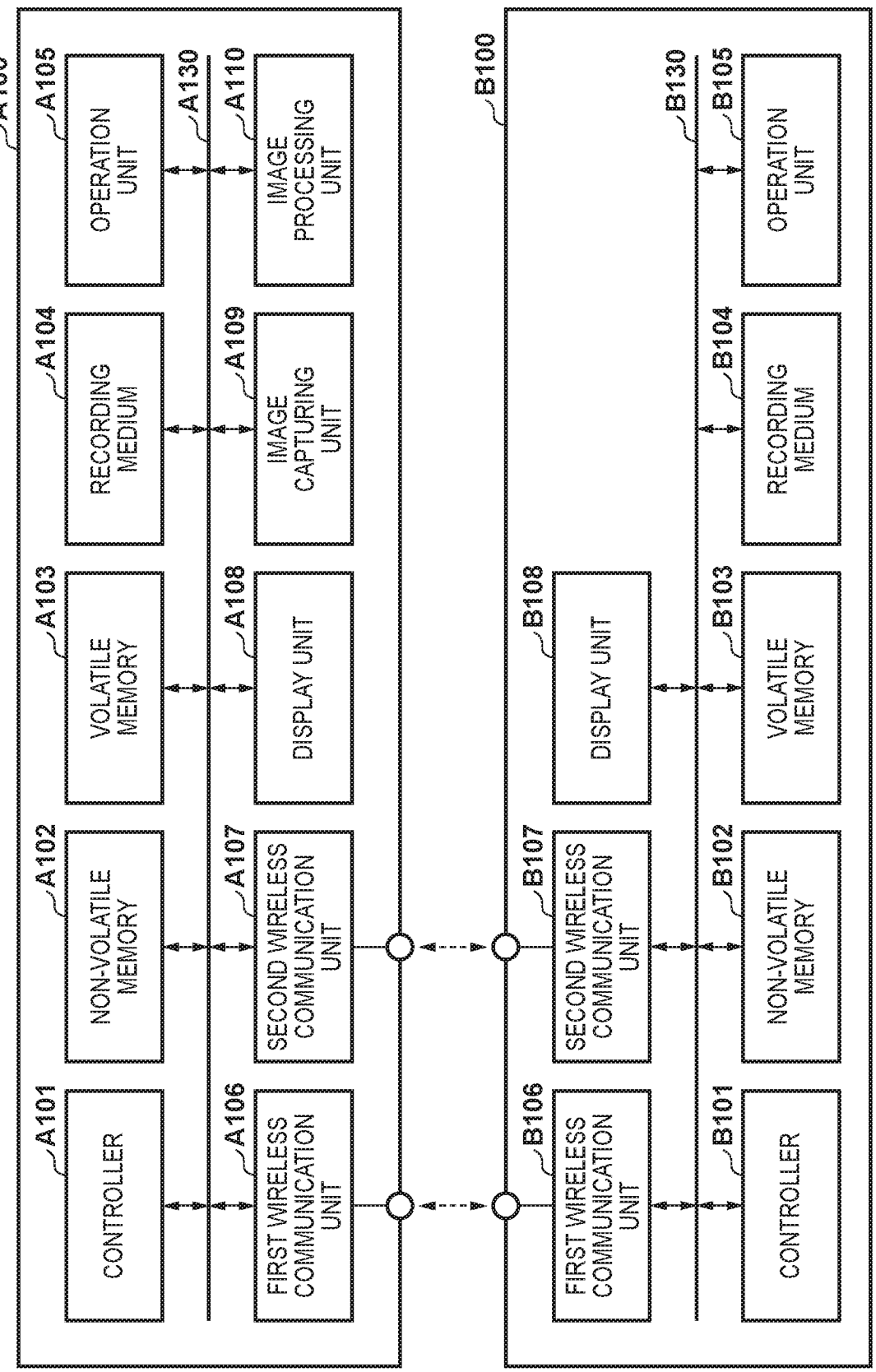
FIG. 1 is a diagram showing one example of configurations of an image capturing apparatus and a communication apparatus according to an embodiment.

FIG. 1 shows the internal configurations of the image capturing apparatus and the communication apparatus that constitute the system of the present embodiment.

First, the configuration and functions of an image capturing apparatus A100 of the present embodiment will be described with reference to FIG. 1.

A controller A101 is a central processing unit (CPU) that performs overall control of the image capturing apparatus A100, and realizes later-described communication processing and control processing by executing programs stored in a non-volatile memory A102 that will be described later. Note that instead of the controller A101 performing overall control of the apparatus, overall control of the apparatus may be performed by allocating processing to pieces of hardware. The same applies to other hardware such as the image capturing apparatus and the communication apparatus that are described below, and such hardware may be configured by allocating processing to pieces of hardware.

The non-volatile memory A102 is an electrically erasable and recordable memory such as an EEPROM. The non-volatile memory A102 records constants, programs, and the like for operations performed by the controller A101. The programs referred to here are programs for executing a communication sequence and a control sequence that will be described later in the present embodiment.

A volatile memory A103 is used as a work area for constants and variables for operations performed by the controller A101, as well as the deployment of programs read out from the non-volatile memory A102, for example. The volatile memory A103 is also used as a buffer memory for temporarily storing image data captured by the image capturing unit A109, and an image display memory used by a display unit A108. Also, the volatile memory A103 is also used as an area for storing parameters and the like related to connection setting of wireless communication implemented by the first wireless communication unit A106 and the second wireless communication unit A107.

Image data output from the image capturing unit A109 is recorded to the recording medium A104, and recorded image files are read out from the recording medium A104 by the controller A101. The recording medium A104 may be, for example, a memory card or a hard disk that is attached to the image capturing apparatus A100, or a flash memory or a hard disk that is built into the image capturing apparatus A100. It is sufficient that the image capturing apparatus A100 has at least a method for accessing the recording medium A104.

An operation unit A105 is constituted by operation members such as various switches and buttons and a touch panel for accepting various operations performed by a user. The operation unit A105 also includes a touch panel that is integrated with a display panel of the display unit A108.

A first wireless communication unit A106 is an interface for connection with an external apparatus such as a communication apparatus B100 that will be described later. The image capturing apparatus A100 of the present embodiment can exchange data with the external apparatus via the first wireless communication unit A106. For example, image data can be transmitted to the external apparatus via the first wireless communication unit A106. Note that in the present embodiment, the first wireless communication unit A106 includes an interface for communicating with the external apparatus via a wireless LAN in accordance with the IEEE 802.11 standard. The controller A101 realizes wireless communication with the external apparatus by controlling the first wireless communication unit A106. Note that the communication method is not limited to a wireless LAN, and can include a wireless communication interface such as an infrared communication interface or Wireless USB.

The first wireless communication unit A106 further has a software-based AP (called "SoftAP" hereinafter) function (master mode). This SoftAP function is a function that enables the first wireless communication unit A106 to behave as a wireless access point under control of the controller A101. In the present embodiment, if the SoftAP function is activated, and a first wireless communication unit B106 of the communication apparatus B100 connects to the first wireless communication unit A106, the image capturing apparatus A100 and the communication apparatus B100 can perform direct wireless communication.

A second wireless communication unit A107 has an antenna for wireless communication, a modulation/demodulation circuit for processing wireless signals, and a communication controller. The second wireless communication unit A107 performs short-range wireless communication in accordance with the IEEE 802.15 standard (so-called Bluetooth®) by outputting wireless signals from the antenna and demodulating wireless signals received by the antenna. Note that the communication method is not limited to Bluetooth®, and may be a wireless communication technique such as ZigBee®.

In the present embodiment, Bluetooth® includes a communication mode called BLE (Bluetooth® Low Energy) in which power consumption is low, but speed is low (low-speed communication mode). Since BLE has a smaller transfer band and lower power consumption than wireless LAN, BLE is more effective than wireless LAN in communication in which the amount of data to be transferred is small and transfer performance is not expected. The second wireless communication unit A107 operates as a peripheral or an advertiser, and communicates with a device operating as a central or an observer. The second wireless communication unit A107 communicates with the second wireless communication unit B107 of the communication apparatus B100.

The display unit A108 displays viewfinder images during shooting, shot images, text for interactive operations, and the like. The display unit A108 is a display device such as a liquid crystal display or an organic electroluminescence display. The display unit A108 may be integrated with the image capturing apparatus A100, or may be an external apparatus that is connected to the image capturing apparatus A100. It is sufficient that the image capturing apparatus A100 can be connected to the display unit A108 and has a function for controlling the display performed by the display unit A108. In addition, the display unit A 108 may have a function of outputting visually perceptible information like an LED.

An image capturing unit A109 is provided with a lens group that includes a zoom lens and a focus lens, and a shutter that includes a diaphragm function. The image capturing unit A109 is also provided with an image sensor that is constituted by a CCD or CMOS element or the like that converts a subject image into an electrical signal, and an A/D converter that converts an analog image signal output by the image sensor into a digital signal, Under control of the controller A101, the image capturing unit A109 converts light from an object image formed by the lenses included in the image capturing unit A109 into an electrical signal with use of the image sensor, performs noise reduction processing and the like, and outputs resulting image data that is expressed by a digital signal, An image processing unit A110 subjects image data obtained by the image capturing unit A109 to resizing processing such as pixel interpolation or size reduction, and color conversion processing. The controller A101 then generates an image file by performing compression encoding such as JPEG compression encoding on still image data obtained by the above processing, or by encoding moving image data with a moving image compression method such as MPEG2 or H.264, and then records the image file to a recording medium A104. With the image capturing apparatus A100 of the present embodiment, image data is recorded to the recording medium A104 in accordance with the DCF (Design rule for Camera File system) standard. The controller A101 also performs predetermined arithmetic processing with use of captured image data, and performs AF (automatic focus) processing and AE (automatic exposure) processing by controlling the focus lens, the diaphragm, and the shutter of the image capturing unit A109 based on the obtained calculation results.

Note that the blocks shown in FIG. 1 are connected to each other via an internal bus A130.

Here, shooting functions and a RAW development function of the image capturing apparatus A100 will be described.

The image capturing apparatus A100 has two types of shooting functions. One is a RAW shooting function in which digital image data (RAW data) input from the image capturing unit A109 is converted into a file in its original state (RAW file), and recorded in the recording medium A104. The other is a JPEG shooting function in which development processing is executed on the RAW data input from the image capturing unit A109, using development parameters that are defined in advance by the image processing unit A110 so as to convert the RAW data to a JPEG file, and the resulting data is recorded to the recording medium A104. Herein, the predefined development parameters are parameters that are set in advance at the time of shooting in accordance with user shooting settings or analysis results of a shot image.

Also, the image capturing apparatus A100 reads out the RAW data or substitute RAW data that was recorded to the recording medium A104 by the above-described RAW shooting function, to the volatile memory A103. The image processing unit A110 is provided with a so-called RAW development function for executing image processing such as image correction, color conversion, and encoding on substitute RAW data that is read out from the volatile memory A103.

This RAW development function is capable of freely designating various development parameter conditions such as exposure correction, white balance adjustment, contrast adjustment, and sharpness, compared to development processing that is executed using predefined development parameters at the time of shooting.

Also, this RAW development function can be executed using two operation methods. One is a method that is performed by the image capturing apparatus A100 in a standalone manner, through a user operation via the operation unit A105. The other is a method for operating the communication apparatus B100 through wireless communication performed by the first wireless communication unit A106 and the second wireless communication unit A107, and is a method that is executed by a remote operation.

Herein, the above-described shooting functions, the RAW file generated by the RAW development function, and the JPEG file, will be described with reference to FIGS. 2A and 2B. FIG. 2A is a diagram showing one example of the RAW file and FIG. 2B is a diagram showing one example of the JPEG file.

In FIG. 2A, the RAW file includes a header portion 200, a thumbnail data portion 201, a substitute RAW data portion 202, a JPEG data portion 203, and a RAW data portion 204.

The header portion 200 is a fixed-length area, and includes information on various metadata, such as shooting model information, setting parameters at the time of shooting, and the above-described predefined development parameters. Also, the header portion 200 includes information indicating whether each image data portion, which will be described later, is present, and an offset value up to a start position. Accordingly, the RAW file has a mechanism by which storage positions of the image data portions can be specified by analyzing the header portion 200.

The thumbnail data portion 201 is an area for storing JPEG data obtained by resizing the RAW data such that the pixel number is about 640×480, and performing development processing using the predefined development parameters. The thumbnail data is used in cases such as where an image is displayed on a small display screen and where small images are displayed on an image list screen, which will be described later, or the like.

The substitute RAW data portion 202 is an area for storing RAW data obtained by resizing RAW data such that the pixel number is about 1920×1440. The substitute RAW data is data used in substitute RAW development processing, which will be described later.

The JPEG data portion 203 is an area for storing JPEG data obtained by performing development processing on RAW data using the predefined development parameters. The JPEG data is data for display that is generated in order to enable the content of an image to be displayed on a display device that does not have the RAW development function.

The RAW data portion 204 is an area for storing RAW data input from the image capturing unit A109 without modification. In this manner, in the shooting processing using the RAW shooting function, the thumbnail data, the substitute RAW data, and the JPEG data for display are generated by the image processing unit A110 using the RAW data, and converted into the RAW file together with the RAW data.

The following is a description of a data configuration of the JPEG file.

In FIG. 2B, the JPEG file includes a header portion 205, a thumbnail data portion 206, and a JPEG data portion 207.

The header portion 205 is similar to the header portion 200 shown in FIG. 2A. The thumbnail data portion 206 is similar to the thumbnail data portion 206 shown in FIG. 2A.

The JPEG data portion 207 is an area for storing JPEG data obtained by performing development processing on the RAW data using default development parameters. In this manner, in the shooting processing using the JPEG shooting function, thumbnail data and JPEG data are generated by the image processing unit A110 using the RAW data, and are converted into a JPEG file.

The file structures of the RAW file and the JPEG file in the recording medium A104 will be described with reference to FIGS. 3A to 3B.

FIG. 3A shows an example of a directory tree.

Among image files 301, files whose file extension is "RAW" are RAW files, and files whose file extension is "JPG" are JPEG files.

A management file 302 manages all of the image files stored in the recording medium A104. The management file 302 is updated at the timing when an image file is added to the recording medium A104 and an image file is updated or deleted.

FIG. 3B shows an example of the management file 302.

The management file 302 includes areas in which various types of information relating to a file path 303, an image ID 304, a generation method 305, and a development target image ID 306 are recorded.

Information on the file paths of the image file 301 is recorded in the file path 303.

The image ID 304 is information for uniquely displaying the image files 301. Although the image IDs are generated from character strings of the file paths in the present embodiment, the present invention is not limited thereto. For example, IDs conforming to UUIDs (Universally Unique Identifiers) defined in RFCA122 may be allocated.

The generation method 305 is information indicating a method by which image tiles are generated. As described above, the RAW files are generated by the RAW shooting function, and the JPEG files are generated by the JPEG shooting function or by the RAW development processing after RAW shooting.

The development target image ID 306 represents the image ID of the RAW file that is subjected to RAW development. The information of this column is valid only in the case where the generation method 305 is "RAW development".

Next, the configurations and functions of the communication apparatus B100 of the present embodiment will be described with reference to FIG. 1.

The communication apparatus B100 of the present embodiment includes a controller B101, a non-volatile memory B102, a volatile memory B103, a recording medium B104, an operation unit B105, a first wireless communication unit B106, a second wireless communication unit B107, and a display unit B108. The basic functions of the aforementioned blocks are similar to those of the image capturing apparatus A100 and therefore will not be described in detail, and the following description focuses on portions that are different.

Processing of the communication apparatus B100 according to the present embodiment is implemented by reading software provided by an application. Note that the application has software for using the basic functions of the OS installed in the communication apparatus B100. Note that the OS of the communication apparatus B100 can have software to implement processes according to the present embodiment.

A non-volatile memory B102 stores a program for controlling wireless communication with the image capturing apparatus A100 and for remotely controlling the RAW development function provided in the image capturing apparatus A100. Hereinafter, this program is called a "camera-linked application".

Control Sequence

Next, a sequence in which the communication apparatus B100 of the present embodiment controls the image capturing apparatus A100 through wireless communication will be described with reference to FIGS. 4A and 4B to FIGS. 6A to 6F.

Figure 4A:
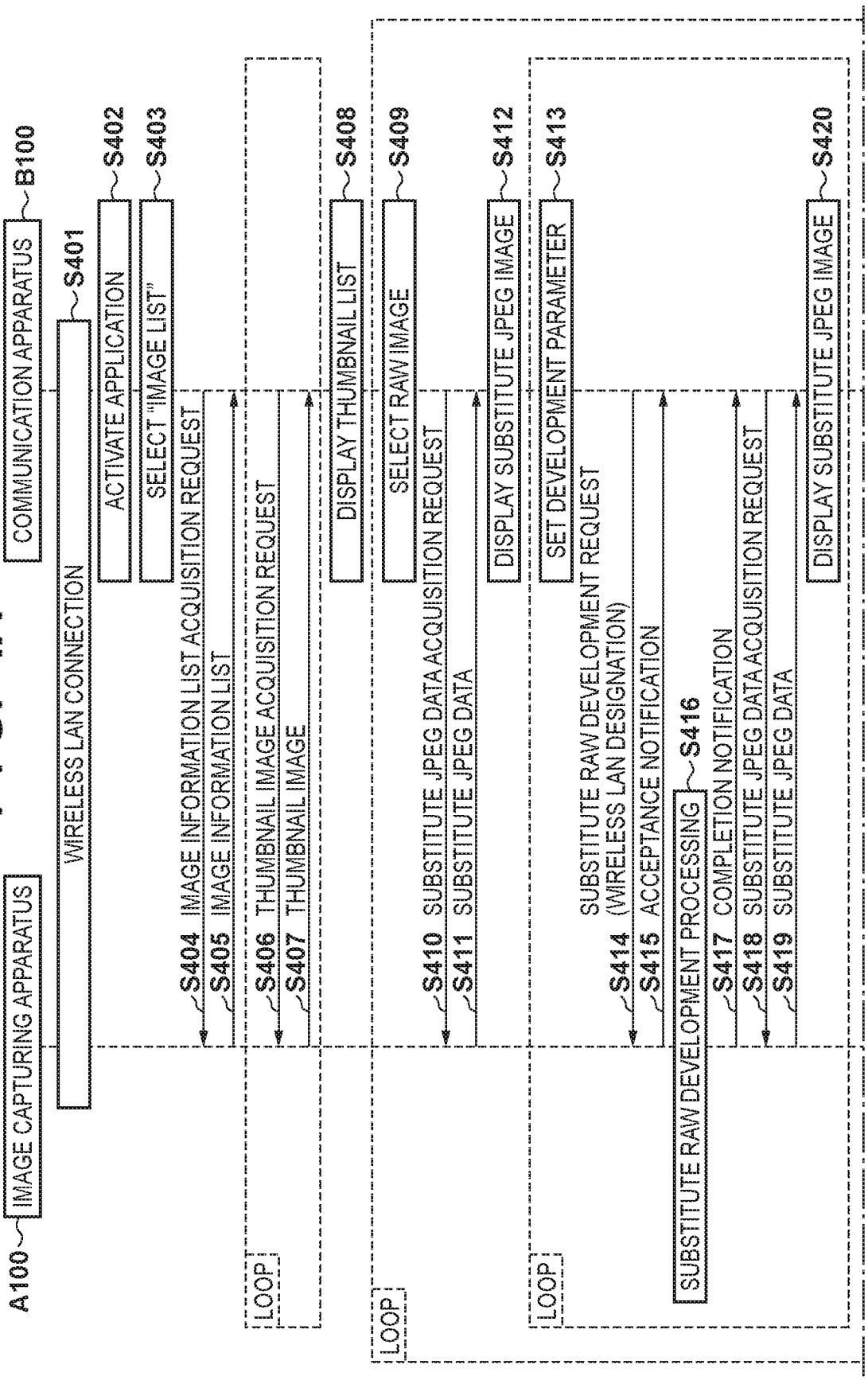
FIGS. 4A and 4B are sequence diagrams showing a communication apparatus of a first embodiment controlling an image capturing apparatus through wireless communication.
Figure 4B:
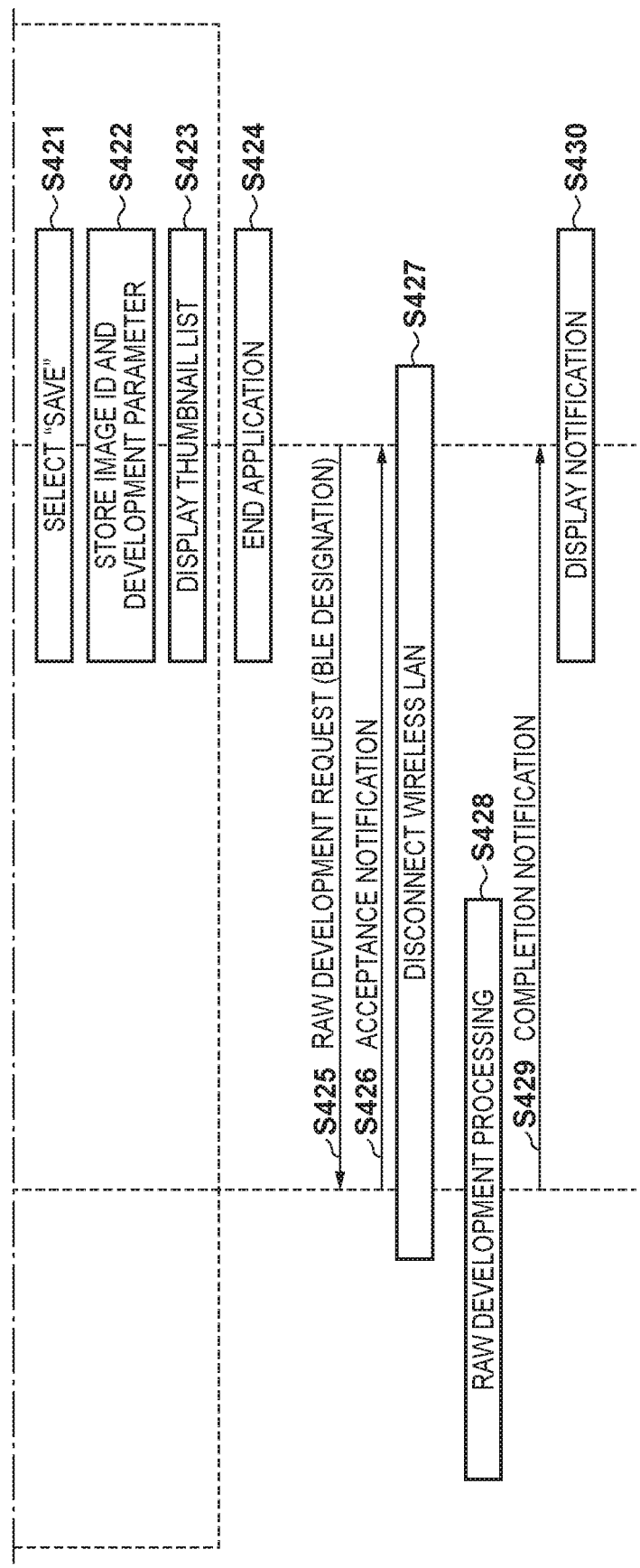

FIGS. 4A and 4B show processing procedures of the image capturing apparatus A100 and the communication apparatus B100 of the present embodiment. FIGS. 5A to 5G respectively show camera-linked application screens of the communication apparatus B100 in the control sequence shown in FIGS. 4A and 4B.

In the present embodiment, a user operates the camera-linked application of the communication apparatus B100 so as to control the RAW development function of the image capturing apparatus A100.

Note that messages that are exchanged between the image capturing apparatus A100 and the communication apparatus B100 via a wireless LAN in this processing can be implemented utilizing a message exchange protocol based on a TCP/IP protocol. In the present embodiment, a description will be given assuming a case where an HTTP protocol is used.

In step S401, the controller B101 of the communication apparatus B100 controls the first wireless communication unit B106 in response to a user operation, and establishes a communication connection with the image capturing apparatus A100 via a wireless LAN. Specifically, the first wireless communication unit A106 of the image capturing apparatus A100 is operated as an access point in advance, and a connection request message is transmitted from the first wireless communication unit A106 of the communication apparatus B100, and thereby the connection can be established. It is assumed that setting parameter information required for a communication connection via the wireless LAN, such as an SSID and an encryption key, is set in the communication apparatus B100 in advance.

Figure 5A:
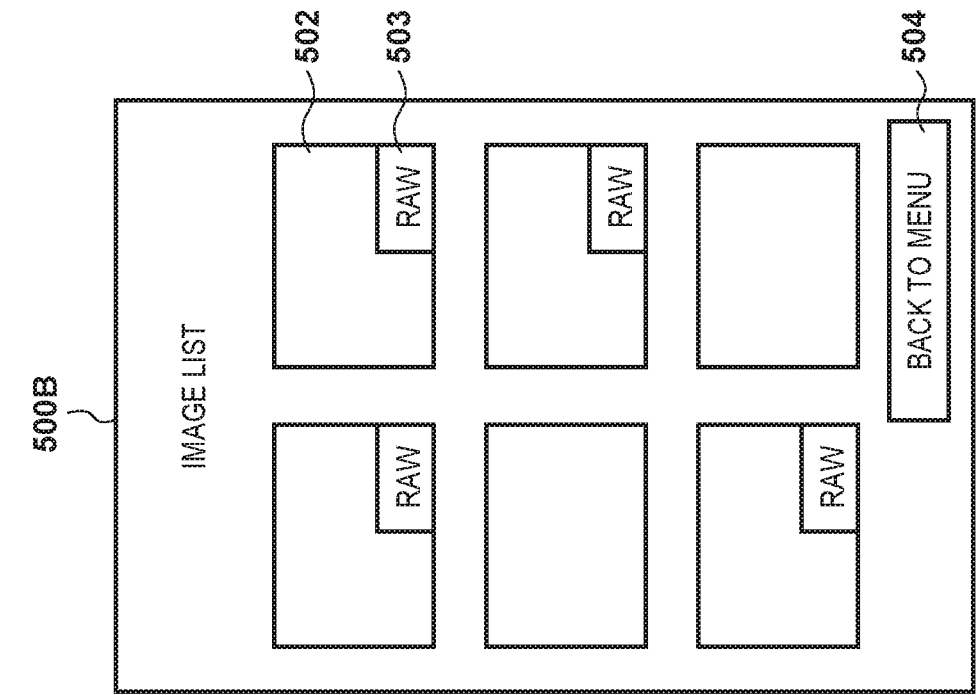

In step S402, the controller B101 of the communication apparatus B100 activates the camera-linked application in response to a user operation. FIG. 5A is an exemplary diagram of a menu screen 500A at the time of application activation that is displayed on the display unit B108 of the communication apparatus B100. On the menu screen 500A shown in FIG. 5A, a button 501 is a button for a user to instruct viewing of image files stored in the recording medium A104 of the image capturing apparatus A100 or start remote control of the RAW development function.

When notified of selection of "image list" by the operation unit B105 in step S403, the controller B101 of the communication apparatus B100 transmits an image information list acquisition request message to the image capturing apparatus A100 from the first wireless communication unit B106 in step S404.

In step S405, the controller A101 of the image capturing apparatus A100 transmits an image information list to the communication apparatus B100 from the first wireless communication unit A106, as a response to the image information list acquisition request message in step S404. The image information list includes information (filenames, format types, image sizes, URLs for acquiring thumbnail images, and the like) relating to the image files stored in the recording medium A104 of the image capturing apparatus A100.

In step S406, the controller B101 of the communication apparatus B100 transmits a thumbnail image acquisition request message to the image capturing apparatus A100 from the first wireless communication unit B106, using a URL for thumbnail image acquisition that is included in the image information list received from the image capturing apparatus A100.

In step S407, the controller A101 of the image capturing apparatus A100 transmits thumbnail image data to the communication apparatus B100 from the first wireless communication unit A106, as a response to the thumbnail acquisition request message in step S406. Here, the controller A101 transmits, to the communication apparatus B100, thumbnail data portions 201 and 206 of the image file designated in the thumbnail acquisition request message.

Figure 5B:
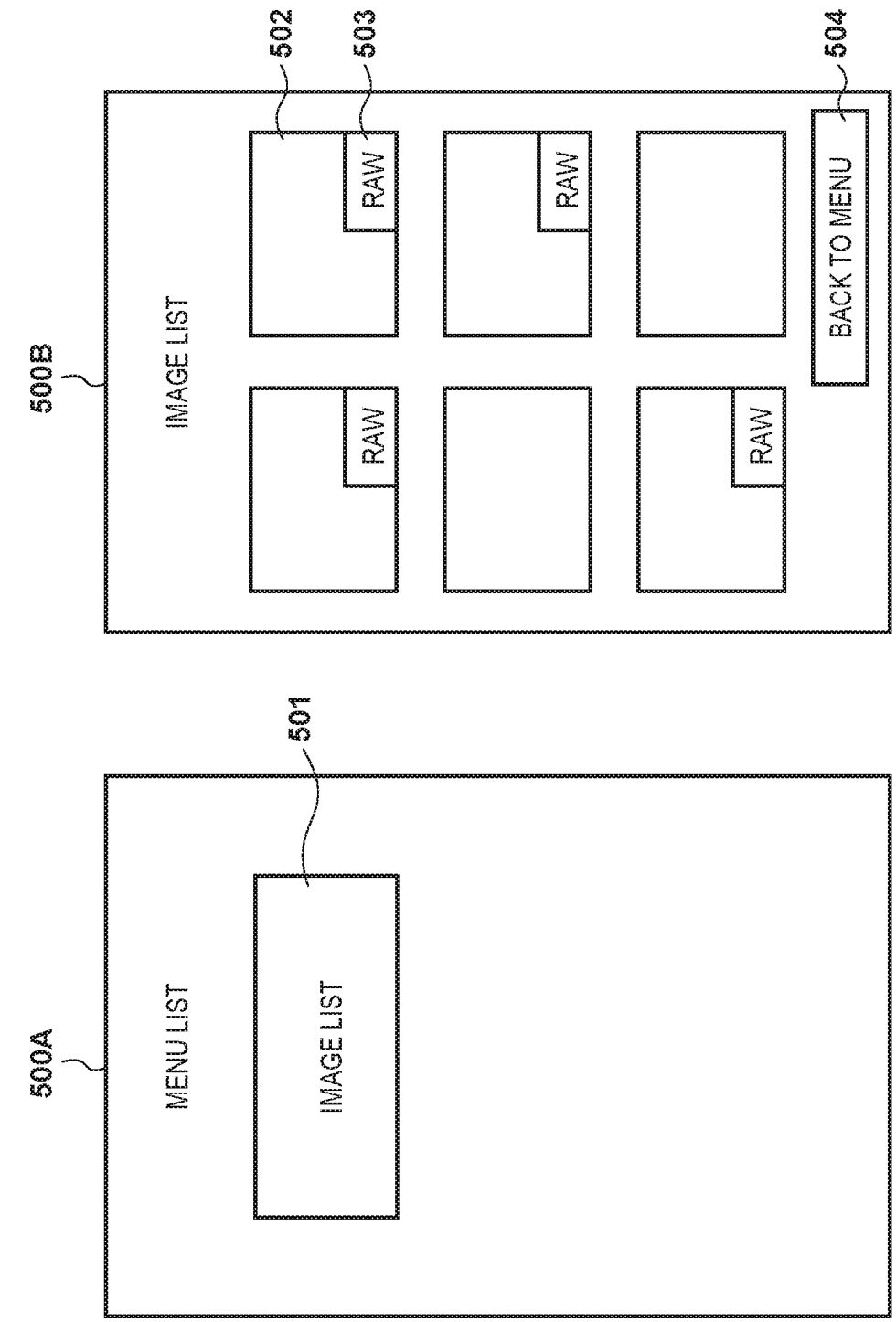

The processes of steps S406 and S407 are executed on all of the image files in a repetitive manner. When these processes end, in step S408, the controller B101 of the communication apparatus B100 displays the image list screen using the thumbnail image data received from the image capturing apparatus A100. FIG. 5B is an exemplary diagram of the image list screen 500B displayed on the display unit B108. In the image list screen 500B shown in FIG. 5B, a button 502 is a thumbnail image and serves as an image selection button. A mark 503 is a mark indicating that the original image of the thumbnail image 502 is a RAW file. The RAW development function, which will be described later, can be executed only in the case where the original image is a RAW file. A button 504 is a button for a user to instruct returning from the image list screen 500B shown in FIG. 5B to the menu screen 500A shown in FIG. 5A.

When notified of selection of the RAW file by the operation unit B105 in step S409, the controller B101 of the communication apparatus B100 transmits a substitute JPEG data acquisition request message to the image capturing apparatus A100 from the first wireless communication unit B106 in step S410.

In step S411, the controller A101 of the image capturing apparatus A100 reads out, to the volatile memory A103, the substitute RAW data portion 202 of the RAW file designated in the substitute JPEG data acquisition request message, as a response to the substitute JPEG data acquisition request message in step S410. Also, the controller A101 of the image capturing apparatus A100 performs development processing by the image processing unit A110 using a predetermined development parameter, and transmits the obtained JPEG data (substitute JPEG data) to the communication apparatus B100 from the first wireless communication unit A106.

Figure 5D:
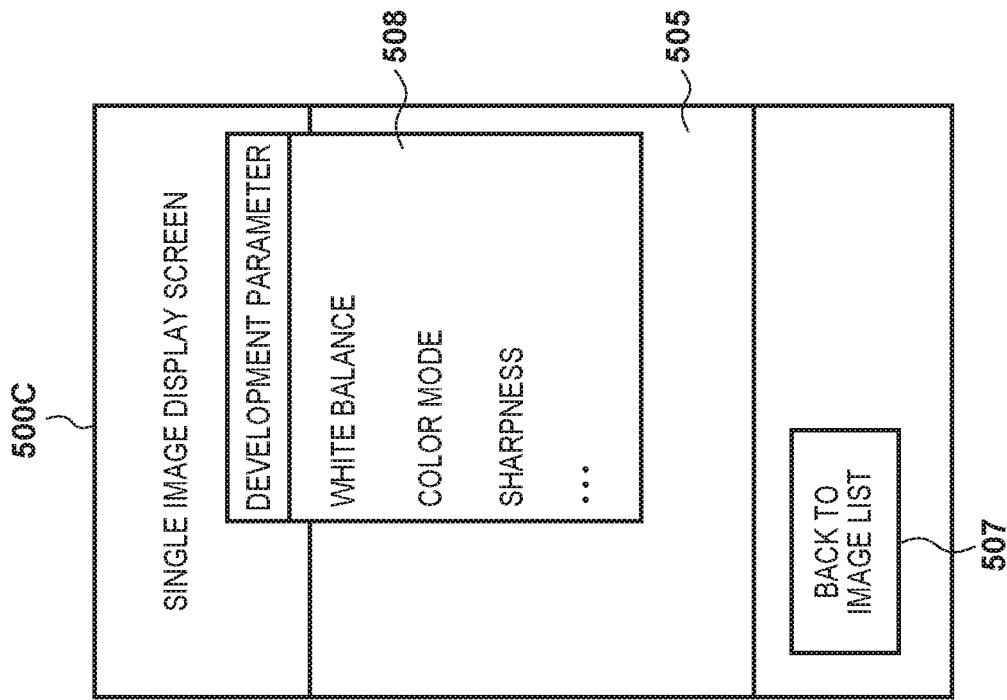
Figure 5C:
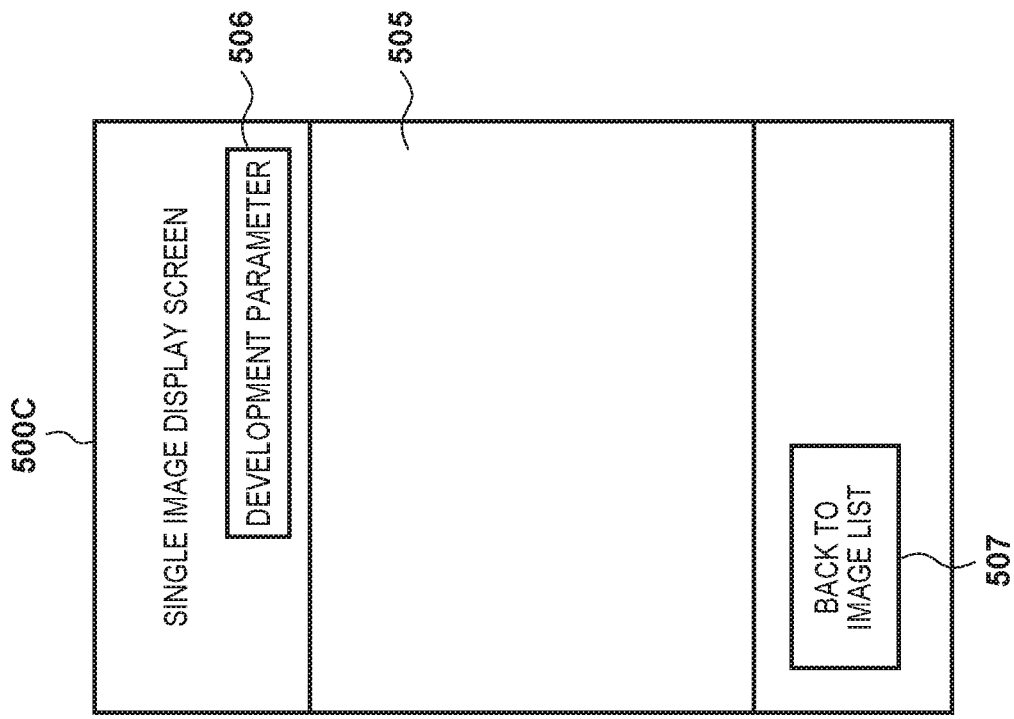

In step S412, the controller B101 of the communication apparatus B100 displays, on the display unit B108, the substitute JPEG data received from the image capturing apparatus A100. FIG. 5C is an exemplary diagram of a single image display screen 500C of the substitute JPEG data displayed on the display unit B108. The single image display screen 500C shown in FIG. 5C has an area 505 in which the substitute JPEG data is displayed. A menu 506 is a pulldown menu from which the user can select development parameters. Details thereof will be described later. A button 507 is a button for the user to instruct returning to the image list screen 500B shown in FIG. 5B.

In step S413, the controller B101 of the communication apparatus B100 accepts a user operation relating to development parameter settings by the operation unit B105. As described above, in the RAW development processing, various development parameters such as exposure correction, white balance adjustment, contrast adjustment, and sharpness can be set.

Figure 5E:
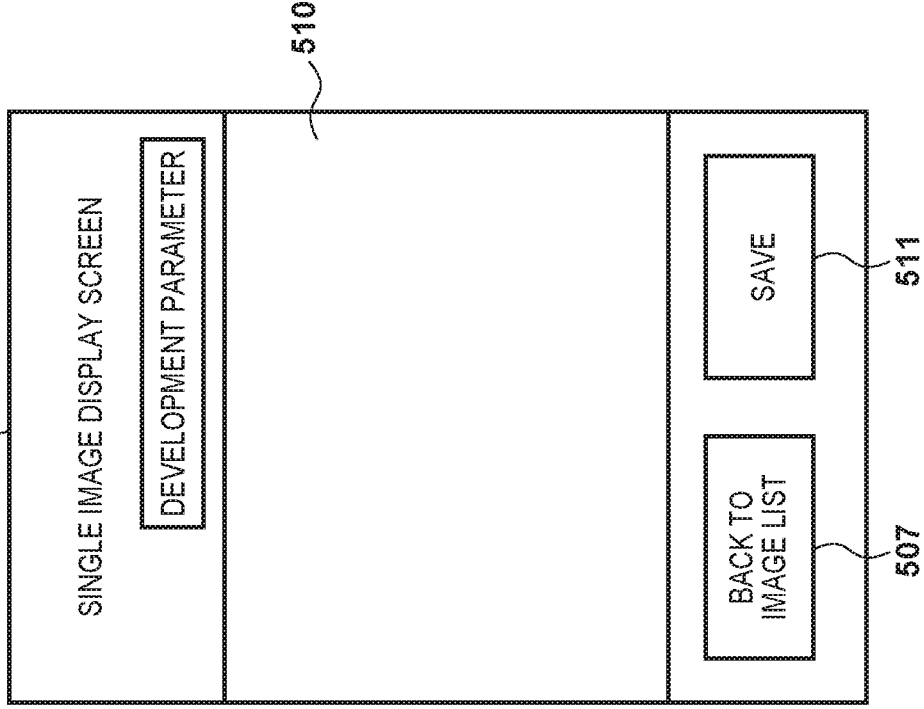

Here, a case where white balance adjustment is performed as the development parameter will be described, for example. On the single image display screen 500C shown in FIG. 5C, when the user selects the development parameter from the pulldown menu 506, as shown in FIG. 5D, a plurality of selection items 508 relating to the development parameters are displayed. When the user selects white balance from these selection items 508, as shown in FIG. 5E, parameter selection items 509 that can be selected in white balance are displayed. By the user selecting a desired parameter from these selection items 509, white balance can be adjusted.

When the user operation that sets the above-described development parameter through the operation unit B105 is accepted, in step S414, the controller B101 of the communication apparatus B100 transmits a substitute RAW data development processing request message to the image capturing apparatus A100 from the first wireless communication unit B106. FIG. 6A shows an example of the content of the development processing request message. In FIG. 6A, a message type 601 represents the type of message. As shown in FIGS. 6A to 6C, there are three types of messages. First, a "development processing request" message that is transmitted in a case where development processing is requested is transmitted by the communication apparatus B100. Second, a "development processing acceptance" message that is transmitted in a case where the development processing request is accepted is transmitted by the image capturing apparatus A100. Third, a "development processing completion" message that is transmitted in a case where development processing completion is notified is transmitted by the image capturing apparatus A100. The message type transmitted in step S414 is a development processing request message.

A session number 602 is the number for associating the above-described three types of messages with each other. The session number 602 is newly set in the communication apparatus B100 that transmits the development processing request message, and in the subsequent development processing acceptance and development processing completion, the same number is maintained.

If the message type is the development processing request, an image number 603 represents the number of images that are subjected to development processing, and if the message type is the development processing completion, the image number 603 represents the number of images that have undergone development processing. In step S414, in order to perform RAW development processing on one image, 1 is set.

A completion notification communication method 604 designates a wireless communication method in a case where the development processing completion message is transmitted. Based on a wireless communication method designated in the completion notification communication method 604, the communication apparatus B100 can select whether to receive the development processing completion message while continuing the communication connection with the wireless LAN, or to disconnect communication connection with the wireless LAN and receive the development processing completion message via BLE. If development processing is performed on RAW data with a large pixel number and a large size, it takes a long time for the image capturing apparatus A100 to perform development processing, and a long waiting time is required until the communication apparatus B100 receives the development processing completion message from the image capturing apparatus A100. By designating BLE as the wireless communication method when the development processing completion message is transmitted in such a case, energy consumption in the wireless LAN communication can be suppressed. In step S414, as one example, it is assumed that BLE is designated in a case where development processing is performed on RAW data, and the wireless LAN is designated in a case where development processing is performed on substitute RAW data with a smaller data amount than the RAW data.

A RAW type 605 shows whether an image to be subjected to RAW development processing is data of the substitute RAW data portion 202 or data of the RAW data portion 204. In step S414, "substitute RAW" is set.

An image ID 606 is identification data that uniquely indicates an image to be subjected to the RAW development processing. The image ID 606 is the same as the image ID 304 shown in FIG. 3B.

A development parameter 607 represents the parameter set in step S413. Note that the items 605, 606, and 607 are set for each image.

In step S415, the controller A101 of the image capturing apparatus A100 transmits a development processing acceptance message to the communication apparatus B100 from the first wireless communication unit A106, as a response to the substitute RAW data development processing request message in step S414. FIG. 6B shows an example of the content of the development processing acceptance message. Note that "wireless LAN" is designated as the completion notification communication method 604 in the development processing request message transmitted in step S414, and thus the subsequent communication connection between the image capturing apparatus A100 and the communication apparatus B100 via the wireless LAN is maintained.

In step S416, the controller A101 of the image capturing apparatus A100 reads out, to the volatile memory A103, data of the substitute RAW data portion 202 of the RAW file designated in the substitute RAW data development processing request message in step S414. Also, the controller A101 of the image capturing apparatus A100 performs development processing with the image processing unit A110 using the development parameter designated in the substitute RAW data development processing request message in step S414 and generates substitute JPEG data. Also, the controller A101 of the image capturing apparatus A100 calculates an estimation time required in a case where development processing is performed on the RAW data portion 204 using a similar development parameter, and stores the calculated estimation time in the volatile memory A103. This estimation time is calculated based on the time required for RAW development in step S416 and the ratio of data sizes between the substitute RAW data portion 202 and the RAW data portion 204.

In step S417, the controller A101 of the image capturing apparatus A100 transmits a development processing completion message to the communication apparatus B100 from the first wireless communication unit A106. FIG. 6C shows an example of the content of the development processing completion message. In FIG. 6C, reference numeral 608 represents a URL for acquiring JPEG generated in the development processing. By executing an HTTP GET request on this URL 608, JPEG can be acquired. Reference numeral 609 represents the estimation time required for the development processing performed on RAW data, and is a value calculated in step S416. The estimation time 609 is included in only the substitute RAW data development processing completion message, and is information utilized as one judgement material for determining a completion notification communication method in a case where the communication apparatus B100 requests development processing for the RAW data.

In step S418, the controller B101 of the communication apparatus B100 transmits a substitute JPEG data acquisition request message to the image capturing apparatus A100 from the first wireless communication unit B106. The substitute JPEG data acquisition request message is executed by accessing the JPEG acquisition URL 608 shown in FIG. 6C with the communication apparatus B100.

In step S419, the controller A101 of the image capturing apparatus A100 transmits the substitute JPEG data generated in step S416 to the communication apparatus B100 from the first wireless communication unit A106, as a response to the substitute JPEG data acquisition request message in step S410.

Figure 5F:
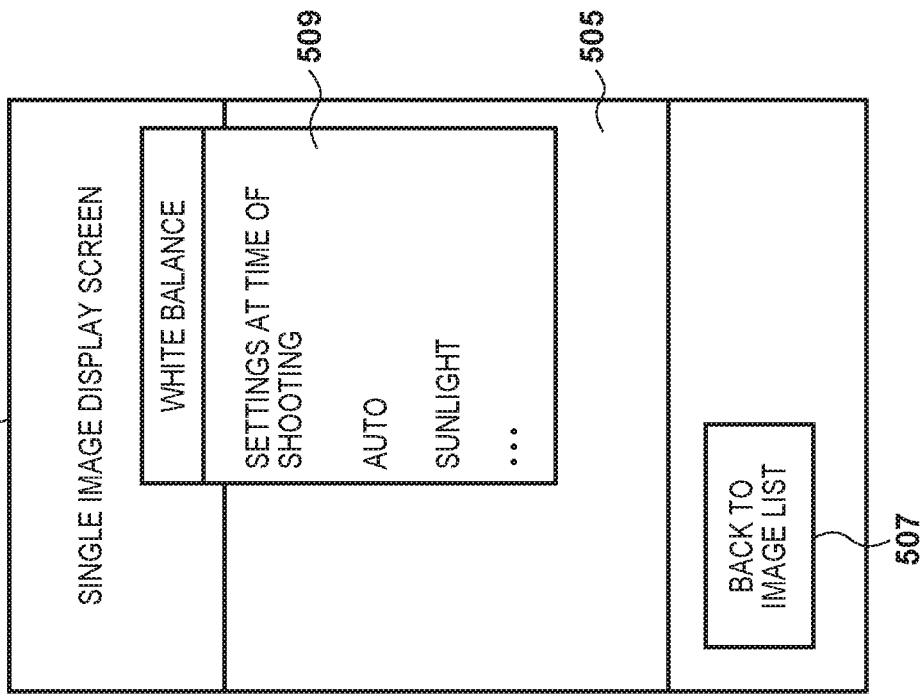

In step S420, the controller B101 of the communication apparatus B100 displays, on the display unit B108, the substitute JPEG data received from the image capturing apparatus A100. FIG. 5F is an exemplary diagram of a single image display screen 500C of the substitute JPEG data displayed on the display unit B108. On the single image display screen 500C shown in FIG. 5F, the substitute JPEG data is displayed in an area 510. A button 511 is a button for a user to designate saving of the substitute JPEG data as an image file.

By performing the above-described processes from step S413 to step S420 in a repetitive manner, the substitute RAW data development processing is repeated until the development parameter desired by the user is achieved.

In step S421, when notified by the operation unit B105 of a save button 511 being operated on the single image display screen 500C shown in FIG. 5F, the controller B101 of the communication apparatus B100 stores the image ID 606 and the development parameter 607 in step S422. The storage area may be the non-volatile memory B102, the volatile memory B103, or the recording medium B104.

In step S423, the controller B101 of the communication apparatus B100 displays the image list screen 500B shown in FIG. 5B on the display unit B108.

By performing the above-described processes from step S409 to step S423 in a repetitive manner, the substitute RAW data development processing is executed on the image desired by the user.

In step S424, when notified by the operation unit B105 of an application end operation being performed, the controller B101 of the communication apparatus B100 transmits a RAW data development processing request message to the image capturing apparatus A100 from the first wireless communication unit B106 in step S425. The application end operation may be an operation provided by an OS installed on the communication apparatus B100.

In step S425, triggered by the application end operation in step S424, the controller B101 of the communication apparatus B100 generates the RAW data development processing request message using the image ID 606 and the development parameter 607 that are stored in step S422, and transmits the generated message to the image capturing apparatus A100. FIG. 6D shows an example of the content of the RAW data development processing request message. As shown in FIG. 6D, in step S425, BLE is designated as the completion notification communication method 610. BLE is designated because it takes time to perform the RAW data development processing, and the subsequent wireless LAN communication becomes unnecessary due to the application end operation performed in step S424.

In step S426, the controller A101 of the image capturing apparatus A100 transmits a development processing acceptance message to the communication apparatus B100 from the first wireless communication unit A106, as a response to the RAW data development processing request message in step S425. FIG. 6E shows an example of the content of the RAW data development processing acceptance message.

In step S427, the controller B101 of the communication apparatus B100 transmits a wireless LAN communication connection disconnection request message to the image capturing apparatus A100 from the first wireless communication unit B106, and disconnects the wireless LAN communication connection with the image capturing apparatus A100. Also, the controller B101 of the communication apparatus B100 controls the second wireless communication unit B107 and activates a BLE observer function. This makes it possible to receive a BLE packet transmitted from the second wireless communication unit A107 of the image capturing apparatus A100.

In step S428, the controller A101 of the image capturing apparatus A100 executes the RAW development processing on all of the images designated in step S425. The controller A101 of the image capturing apparatus A100 reads out, to the volatile memory A103, the RAW data portion 204 of the RAW file corresponding to the image ID designated in step S425 from the recording medium A104. Then, the controller A101 of the image capturing apparatus A100 performs development processing with the image processing unit A110 under the development parameter condition designated in step S425, and generates JPEG data. Also, the image processing unit A110 generates thumbnail data, and generates a JPEG file as shown in FIG. 2B together with the JPEG data. The generated JPEG file is recorded to the recording medium A104.

In step S429, the controller A101 of the image capturing apparatus A100 transmits a development processing completion message to the communication apparatus B100 from the second wireless communication unit A107. FIG. 6F shows an example of the content of the RAW data development processing completion message. Specifically, the image capturing apparatus A100 transmits a BLE advertised packet to the communication apparatus B100, and the communication apparatus B100 transmits a connection request message to the image capturing apparatus A100, and thereby a BLE communication connection is established. Thereafter, in the BLE communication connection state, the image capturing apparatus A100 transmits the development processing completion message to the communication apparatus B100 based on the mechanism of a GAIT (Generic ATTribute) profile defined in a BLE standard. If a state in which a BLE packet does not arrive occurs due to a reason such as the image capturing apparatus A100 being located greater than or equal to a communicable distance away from the communication apparatus B100, retry processing may be executed after waiting for a predetermined time. Also, retry processing may be repeated until the number of instances of retry processing reaches a predetermined upper limit number.

In step S430, the controller B101 of the communication apparatus B100 displays, on the display unit B108, a message 512 indicating the development processing completion as shown on a notification screen 500E shown in FIG. 5G. Note that information on the time required for the RAW development processing may be displayed on the notification screen 500E shown in FIG. 5G.

By executing the above-described processing, it is possible to wait for reception of the development processing completion message to the RAW data development processing request message transmitted via the wireless LAN with BLE with a lower energy consumption than the wireless LAN. This makes it possible to reduce the energy consumption and suppress battery consumption because it is not necessary to maintain the wireless LAN communication connection until reception of the development processing completion message. Also, after the wireless LAN communication connection is disconnected, the communication apparatus B100 can use the wireless LAN in other applications. Also, because the development processing completion message has a small data amount, it is said that switching to BLE hardly affects performance. Thus, the performance experienced by the user can be maintained.

The processing shown in FIGS. 4A and 4B ends when the communication apparatus B100 displays a completion notification in step S430. In contrast, by executing processes that are similar to those of steps S418 and S419 after step S430, the communication apparatus B100 can execute processing for acquiring the JPEG file generated in step S428 from the image capturing apparatus A100. The JPEG file acquisition processing may be executed, triggered by the user operation on the communication apparatus B100, or may be executed, triggered by reception in step S429.

Also, the RAW development processing request in step S425 is executed, triggered by the detection of the application end operation in step S424, but is not limited thereto, and may be executed, triggered by the other processing. For example, the RAW development processing request may be executed, triggered by the end of the processing of step S422. In this case, instead of executing the RAW development processing collectively on a plurality of pieces of RAW data, the RAW development processing is executed on each RAW file for which "save" is selected in step S421. Also, in this case, the communication apparatus B100 may designate the wireless LAN, assuming the subsequent RAW file development processing with the RAW development processing completion notification communication method. Alternatively, either BLE or the wireless LAN may be designated based on information relating to "the estimation time required for the RAW data development processing" acquired in step S417. Also, after BLE is designated and the RAW development processing is executed, in order to execute the subsequent RAW development processing, it is possible to execute processing similar to that of step S401 and establish the wireless LAN communication connection again.

Also, although processing relating to the BLE communication described in steps S427 and S429 was described assuming that as an initial state, the BLE communication connection is not established between the communication apparatus B100 and the image capturing apparatus A100, this processing may be performed in a state in which the BLE communication connection is established in advance. In this case, an empty packet (PDU) is transferred in a constant cycle between the second wireless communication unit A107 of the communication apparatus B100 and the second wireless communication unit B107 of the image capturing apparatus A100, up to step S429. Then, in step S429, the image capturing apparatus A100 may transmit the development processing completion message to the communication apparatus B100 based on the mechanism of the GATT profile.

Also, the development processing acceptance notification executed in steps S415 and S426 is not always necessary, and may be omitted.

Also, the RAW development processing described in step S428 can be implemented in another mode. For example, after the image processing unit A110 performs development processing and generates the JPEG data and the thumbnail data, instead of generating a new JPEG file, processing for substituting the thumbnail data portion 201 and the JPEG data portion 203 of a target RAW file with the generated data may be executed.

Note that although data of a still image was described as an example of the RAW development processing target in the present embodiment, the present invention is not limited thereto, and data of a moving image may be used.

Although the RAW development processing was described as processing relating to the image data in the present embodiment, the present invention is not limited thereto. For example, the processing relating to the image data may be processing in which the image capturing apparatus A100 analyzes image data in response to a request from the communication apparatus B100, and generates or extracts metadata of face information or the like, processing in which the image capturing apparatus A100 searches for the corresponding image based on a search key designated by the communication apparatus B100, or the like.

Second Embodiment

Next, a second embodiment will be described.

In the first embodiment, processing was described in which, if the communication apparatus B100 controls the image capturing apparatus A100 through wireless communication, the development processing completion message communication method was designated in the development processing request message and the development processing completion message is transmitted with the designated communication method.

In contrast, in the second embodiment, processing will be described in which, after a RAW development processing request message is transmitted to the image capturing apparatus A100, the development processing completion message communication method is changed, and a development processing completion message is transmitted with the changed communication method.

The second embodiment differs from the first embodiment in a function provided in a camera-linked application of the communication apparatus B100. The camera-linked application of the second embodiment includes a function for remotely controlling a RAW development function of the image processing unit A110 of the image capturing apparatus A100 and a function for remotely controlling an image capturing function of the image capturing unit A109.

The configurations of the image capturing apparatus A100 and the communication apparatus B100 other than the camera-linked application, and the configurations and the file structures of a RAW file and a JPEG file of the present embodiment are similar to those of the first embodiment.

Hereinafter, RAW development function remote control processing of the image capturing apparatus A100 by the camera-linked application of the second embodiment will be described with reference to FIGS. 7A and 7B. Note that in the processing of FIGS. 7A and 7B, processes that are the same as the processes described in FIGS. 4A and 4B are given the same reference numerals and will not be described.

Figure 8:
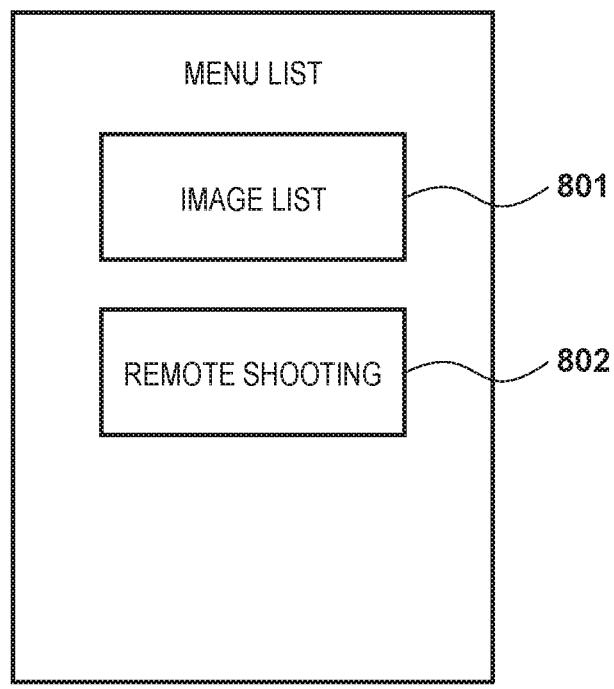
FIG. 8 is an exemplary diagram of an application screen of the communication apparatus of the second embodiment.

In step S701, the control unit B101 of the communication apparatus B100 activates the camera-linked application in response to a user operation. FIG. 8 is an exemplary diagram of a menu screen 800 at the time of application activation that is displayed on the display unit B108 of the communication apparatus B100. On the menu screen 800 shown in FIG. 8, a button 801 is a button for a user to instruct viewing of image files stored in the recording medium A104 of the image capturing apparatus A100 or start remote control of the RAW development function. A button 802 is a button for instructing start of remote control of the shooting function of the image capturing apparatus A100.

In step S702, similarly to step S408 in FIG. 4A, the control unit B101 of the communication apparatus B100 displays an image list screen shown in FIG. 5B using thumbnail image data received from the image capturing apparatus A100.

In step S703, when notified by the operation unit B105 of a "back to menu" button 504 being selected on the image list screen 500B shown in FIG. 5B, the controller 1B101 of the communication apparatus B100 displays, on the display unit B108, a top menu screen shown in FIG. 8.

In step S704, similarly to step S425 in FIG. A13, the controller B101 of the communication apparatus B100 generates, triggered by an "image list" end operation in step S703, a message to request RAW data development processing using an image ID 606 and a development parameter 607 that are stored in step S422, and transmits the generated message to the image capturing apparatus A100. FIG. 9A shows an example of the content of the RAW data development processing request message. As shown in FIG. 9A, in step S704, wireless LAN is designated as a completion notification communication method B10. This is because there is a possibility that data transfer will be continuously executed via the wireless LAN by executing "remote shooting", which is another function of the camera-linked application, after the "image list" end operation in step S703.

In step S705, the controller A101 of the image capturing apparatus A100 transmits a development processing acceptance message to the communication apparatus B100 from the first wireless communication unit A106, as a response to the RAW data development processing request message in step S704. FIG. 9B shows an example of the content of the RAW data development processing acceptance message.

In step S706, similarly to step S428, the controller A101 of the image capturing apparatus A100 executes the RAW development processing on all of the images designated in step S704. The details of the RAW development processing are similar to those of the processing of step S428 shown in FIG. 4B. Note that the RAW development processing started in step S706 ends in step S711, which will be described later.

Similarly to step S424, in step S707, when notified by the operation unit B105 of an application end operation being performed, the control unit B101 of the communication apparatus B100 transmits a RAW development processing completion notification communication method change request message to the image capturing apparatus A100 from the first wireless communication unit B106, in step S708. Note that from steps S704 to S707, a wireless LAN communication connection is maintained between the communication apparatus B100 and the image capturing apparatus A100, and thus, a user can utilize a "remote shooting" function before performing the application end operation.

In step S708, triggered by the application end operation in step S707, the controller B101 of the communication apparatus B100 generates a message to request changing of the RAW development processing completion notification communication method to BLE, and transmits the generated message to the image capturing apparatus A100. FIG. 9C shows an example of the content of the RAW data development processing completion notification communication method change request message.

In step S709, the controller A101 of the image capturing apparatus A100 generates a change completion message indicating that the RAW development processing completion notification communication method has been changed and transmits the generated message to the communication apparatus B100, as a response to the RAW development processing completion notification communication method change request message in step S708. FIG. 9D shows an example of the content of the change completion message.

As shown in FIGS. 9C and 9D, in the present embodiment, two message types are added to the three types of the first embodiment. Fourth, as shown in FIG. 9C, a message type 902 "completion notification communication method change request", which is transmitted when a completion notification communication method change request is transmitted, represents a completion notification communication method change request, and BLE is designated as a completion notification communication method 903. Fifth, as shown in FIG. 9D, a message type 904 "completion notification communication method change completion", which is transmitted when completion of the completion notification communication method change is notified, represents the completion of completion notification communication method change.

In step S710, similarly to step S427, the controller B101 of the communication apparatus B100 transmits a wireless LAN communication connection disconnection request message to the image capturing apparatus A1.00 from the first wireless communication unit B106, and disconnects the wireless LAN communication connection with the image capturing apparatus A100.

In step S711, the controller A101 of the image capturing apparatus A100 ends execution of the RAW development processing started in step S706.

According to the above-described processing, after transmission of the development processing request message, the development processing completion message communication method can be changed, and the state of the communication apparatus B100, that is, the development processing completion message communication method, can be flexibly set in accordance with the necessity of data transfer via a wireless LAN. Specifically, the above-described processing can handle cases such as where it is desired to view an image immediately after execution of development processing as appropriate.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-155880, filed Aug. 10, 2017 which is hereby incorporated by reference herein in its entirety.

What is claimed is:

1. An image capturing apparatus comprising:
a first wireless communication unit configured to perform communication with a communication apparatus using a first wireless communication method;
a second wireless communication unit configured to perform wireless communication with the communication apparatus using a second wireless communication method with which energy consumption is lower than with the first wireless communication method; and
a control unit configured to, if a processing request relating to image data is received from the communication apparatus via the first wireless communication unit, disconnect a connection with the communication apparatus via the first wireless communication unit, and transmit a completion notification after executing predetermined processing corresponding to the processing request to the communication apparatus via the second wireless communication unit.

2. The apparatus according to claim 1, wherein
the processing request includes information that designates a wireless communication method to be used to transmit the completion notification, and
the control unit transmits, if the first wireless communication method is designated based on the information included in the processing request, the completion notification to the communication apparatus using the first wireless communication unit, and
disconnects, if the second wireless communication method is designated based on the information included in the processing request, the connection with the communication apparatus via the first wireless communication unit, and transmits the completion notification to the communication apparatus using the second wireless communication unit.

3. The apparatus according to claim 2, further comprising an acceptance unit configured to accept changing of the information from the communication apparatus via the first wireless communication unit,
wherein the control unit transmits, if the acceptance unit accepts changing to the first wireless communication method, the completion notification to the communication apparatus via the first wireless communication unit, and
disconnects, if the acceptance unit accepts changing to the second wireless communication method, the connection with the communication apparatus via the first wireless communication unit, and transmits the completion notification to the communication apparatus using the second wireless communication unit.

4. The apparatus according to claim 1, wherein
the predetermined processing is RAW data development processing.

5. The apparatus according to claim 4, wherein
the RAW data development processing includes one of processing for developing RAW data corresponding to an original image and processing for developing RAW data corresponding to a substitute image of the original image.

6. The apparatus according to claim 5, wherein
the control unit has a unit configured to estimate a time required for the processing for developing the RAW data of the original image corresponding to the substitute image, based on a result of executing the processing for developing RAW data of the substitute image.

7. The apparatus according to claim 6, wherein
the control unit adds the estimated time to a notification of acceptance of the processing request.

8. A communication apparatus comprising:
a first wireless communication unit configured to perform communication with an image capturing apparatus using a first wireless communication method;
a second wireless communication unit configured to perform wireless communication with the image capturing apparatus using a second wireless communication method with which energy consumption is lower than with the first wireless communication method; and
a control unit configured to, if a processing request relating to image data is transmitted to the image capturing apparatus via the first wireless communication unit, disconnect a connection with the image capturing apparatus via the first wireless communication unit, and receive a completion notification after executing predetermined processing corresponding to the processing request from the image capturing apparatus via the second wireless communication unit.

9. The apparatus according to claim 8, wherein
the processing request includes information that designates a wireless communication method to be used to transmit the completion notification, and the control unit adds the information to the processing request and receives the completion notification from the image capturing apparatus using the wireless communication method designated in the information.

10. The apparatus according to claim 9, wherein
the control unit transmits a request to change the wireless communication method to the image capturing apparatus via the first wireless communication unit,
receives, if changing to the first wireless communication method is requested, the completion notification from the image capturing apparatus via the first wireless communication unit, and
disconnects, if changing to the second wireless communication method is requested, the connection with the image capturing apparatus via the first wireless communication unit, and receives the completion notification from the image capturing apparatus using the second wireless communication unit.

11. The apparatus according to claim 9, wherein
the predetermined processing is RAW data development processing.

12. The apparatus according to claim 11, wherein
the RAW data development processing includes one of processing for developing RAW data corresponding to an original image and processing for developing RAW data corresponding to a substitute image of the original image.

13. The apparatus according to claim 11, wherein the control unit acquires a time required for the RAW data development processing in the image capturing apparatus from the image capturing apparatus, and determines a wireless communication method to be included in the information, based on the time acquired from the image capturing apparatus.

14. A control method of an image capturing apparatus having a first wireless communication unit configured to perform communication with a communication apparatus using a first wireless communication method, and a second wireless communication unit configured to perform wireless communication with the communication apparatus using a second wireless communication method with which energy consumption is lower than with the first wireless communication method, the method comprising:
if a processing request relating to image data is received from the communication apparatus via the first wireless communication unit, disconnecting a connection with the communication apparatus via the first wireless communication unit; and
transmitting a completion notification after executing predetermined processing corresponding to the processing request to the communication apparatus via the second wireless communication unit.

15. A control method of a communication apparatus having a first wireless communication unit configured to perform communication with an image capturing apparatus using a first wireless communication method and a second wireless communication unit configured to perform wireless communication with the image capturing apparatus using a second wireless communication method with which energy consumption is lower than with the first wireless communication method, the method comprising:
if a processing request relating to image data is transmitted to the image capturing apparatus via the first wireless communication unit, disconnecting a connection with the image capturing apparatus via the first wireless communication unit; and
receiving a completion notification after executing predetermined processing corresponding to the processing request from the image capturing apparatus via the second wireless communication unit.

16. A non-transitory computer-readable storage medium storing a program for causing a computer to function as an image capturing apparatus comprising:
a first wireless communication unit configured to perform communication with a communication apparatus using a first wireless communication method;
a second wireless communication unit configured to perform wireless communication with the communication apparatus using a second wireless communication method with which energy consumption is lower than with the first wireless communication method; and
a control unit configured to, if a processing request relating to image data is received from the communication apparatus via the first wireless communication unit, disconnect a connection with the communication apparatus via the first wireless communication unit, and transmit a completion notification after executing predetermined processing corresponding to the processing request to the communication apparatus via the second wireless communication unit.

17. A non-transitory computer-readable storage medium storing a program for causing a computer to function as a communication apparatus comprising:
a first wireless communication unit configured to perform communication with an image capturing apparatus using a first wireless communication method;
a second wireless communication unit configured to perform wireless communication with the image capturing apparatus using a second wireless communication method with which energy consumption is lower than with the first wireless communication method; and
a control unit configured to, if a processing request relating to image data is transmitted to the image capturing apparatus via the first wireless communication unit, disconnect a connection with the image capturing apparatus via the first wireless communication unit, and receive a completion notification after executing predetermined processing corresponding to the processing request from the image capturing apparatus via the second wireless communication unit.

18. An apparatus comprising:
a storage unit configured to store at least one RAW image data;
a first wireless communication unit configured to perform communication with a communication apparatus using a first wireless communication method;
a second wireless communication unit configured to perform wireless communication with the communication apparatus using a second wireless communication method with which energy consumption is lower than with the first wireless communication method; and
a control unit configured to, if a development processing request to the at least one RAW image data stored the storage unit is received from the communication apparatus via the first wireless communication unit, disconnect a connection with the communication apparatus via the first wireless communication unit, and transmit a completion notification after executing predetermined processing corresponding to the development processing request to the communication apparatus via the second wireless communication unit.

19. The apparatus according to claim 18, wherein
the development processing request includes information that designates a wireless communication method to be used to transmit the completion notification, and
the control unit transmits, if the first wireless communication method is designated based on the information included in the development processing request, the completion notification to the communication apparatus using the first wireless communication unit, and
disconnects, if the second wireless communication method is designated based on the information included in the development processing request, the connection with the communication apparatus via the first wireless communication unit, and transmits the completion notification to the communication apparatus using the second wireless communication unit.

\* \* \* \* \*